United States Patent
Sakamoto

(10) Patent No.: US 7,199,171 B2
(45) Date of Patent: Apr. 3, 2007

(54) (METH)ACRYLIC RESIN COMPOSITION

(75) Inventor: Hideyuki Sakamoto, Takasago (JP)

(73) Assignee: Kaneka Corporation, Osaka-shi (JP)

( * ) Notice: Subject to any disclaimer, the term of this patent is extended or adjusted under 35 U.S.C. 154(b) by 284 days.

(21) Appl. No.: 10/750,833

(22) Filed: Jan. 5, 2004

(65) Prior Publication Data

US 2005/0148716 A1    Jul. 7, 2005

(51) Int. Cl.
*C08K 5/04* (2006.01)
(52) U.S. Cl. ............ 524/394; 524/398; 524/399; 524/400
(58) Field of Classification Search ........... 524/394, 524/398, 399, 400
See application file for complete search history.

(56) References Cited

U.S. PATENT DOCUMENTS

| | | |
|---|---|---|
| 5,063,259 A | 11/1991 | Wanat et al. |
| 5,451,624 A | 9/1995 | Memon et al. |
| 5,726,245 A | 3/1998 | Numrich et al. |
| 6,013,723 A * | 1/2000 | Akao .................... 524/577 |
| 2002/0123566 A1 | 9/2002 | Tajima et al. |
| 2002/0177658 A1 | 11/2002 | Tajima et al. |

FOREIGN PATENT DOCUMENTS

JP    2002-241572 A    8/2002

OTHER PUBLICATIONS

Edited by Kunio Goto, "Plastic oyobi Gum-yo Tonkazai Jitsuyo Binran", Kagaku Kogyosha, Oct. 1, 1972, p. 162.
Herman F. Mark et al., Encyclopedia of Polymer Science and Technology, John Wiley & Sons, Inc., New York, 1966, vol. 5, p. 126-139, 'Driers and Metallic Soaps', especially p. 137, Rubber and Plastics.

* cited by examiner

*Primary Examiner*—Peter D. Mulcahy
(74) *Attorney, Agent, or Firm*—Kenyon & Kenyon LLP

(57) ABSTRACT

The present invention provides a (meth)acrylic resin composition, in which thermal degradation when processing is inhibited and discoloring hardly occurs, which could not be obtained in the conventional (meth)acrylic resin composition containing (meth)acrylic resin prepared by suspension polymerization. More specifically, the present invention relates to a (meth)acrylic resin composition comprising 100 parts by weight of a methyl methacrylate polymer obtained by suspension polymerizing 50 to 100% by weight of methyl methacrylate and 50 to 0% by weight of a monomer copolymerizable therewith, 1 to 200 parts by weight of a copolymer having a multi-layer structure and 0.02 to 10 parts by weight of a fatty acid metallic salt.

20 Claims, No Drawings

(METH)ACRYLIC RESIN COMPOSITION

BACKGROUND OF THE INVENTION

The present invention relates to a (meth)acrylic resin composition, in which thermal degradation when processing is inhibited and discoloring hardly occurs, and a capstock and extrusion-molded article comprising the (meth)acrylic resin composition.

(Meth)acrylic resin has conventionally been used as substitute material for glass due to water-clear appearance characteristic of (meth)acrylic resin. Utilizing its excellent weather resistance, (meth)acrylic resin is also used as a capstock, which covers the surface of materials used outdoors.

(Meth)acrylic resin is prepared by radical polymerization such as bulk polymerization, suspension polymerization and emulsion polymerization and of these, bulk polymerization is most widely employed, in that the amount of impurities is small. In the case of bulk polymerization, the final form of the (meth)acrylic resin product is pellets. However, because most of the ingredients added when forming the composition such as an impact modifier and a processing aid are in the form of powder, the pellets and the powder separate when compounding, transporting and extrusion molding and mixing and dispersion of the constituent elements may become inhomogeneous.

In contrast, in the case of suspension polymerization, particles having a size of a few dozen to a few thousand microns can be obtained by polymerization and after going through steps of washing and drying, a (meth)acrylic resin product can be obtained as powder of true spherical shape. Therefore, there is the advantage that mixing and dispersion with the other powder form ingredients are excellent. However, in order to maintain the dispersion stability of monomer and polymer drops in polymerization, a large amount of a dispersion stabilizer or a dispersion stabilizing aid must be added as a secondary ingredient. As a result, a small amount of impurities remain even after washing and this is considered to be the source of degradation when processing. In the case that the amount of the dispersion stabilizer is decreased, because the dispersion stabilization of monomer and polymer drops decrease along with decrease in concentration, the monomer and polymer drops adhere together and consequently, polymer particles with a wide particle distribution are produced. Also, when the balance of conditions is lost, the entire polymerization system may agglomerate. Therefore, the problem of thermal degradation when processing makes selecting the type of dispersion stabilizer and adjusting the concentration difficult, in terms of stable production and particle size control.

With respect to improving thermal stability of (meth)acrylic resin, disclosed are the method of adding an inorganic phosphorus-type reducing agent (U.S. Pat. No. 5,063,259), the method of improving coloring by compounding an acrylic rubber core-shell polymer, in which an organic or inorganic phosphorus-type reducing agent is added (JP-A-4-226558) and the method of improving coloring by compounding MBS containing hindered phenol and phosphite (JP-A-7-286087). These methods are effective with respect to thermal degradation when processing of (meth)acrylic resin, but cannot inhibit coloring due to thermal degradation caused by the dispersion stabilizer used for the (meth)acrylic resin in suspension polymerization of the present invention.

In this way, in reality, a (meth)acrylic resin composition, which is in the form of powder and in which thermal degradation when processing is small, does not exist.

SUMMARY OF THE INVENTION

The object of the present invention is to provide a (meth)acrylic resin composition, in which thermal degradation when processing is inhibited and discoloring hardly occurs, which could not be obtained in the conventional (meth)acrylic resin composition containing (meth)acrylic resin prepared by suspension polymerization. In the present invention, (meth)acryl refers to acryl and/or methacryl.

The present invention relates to a (meth)acrylic resin composition comprising 100 parts by weight of a methyl methacrylate polymer obtained by suspension polymerizing 50 to 100% by weight of methyl methacrylate and 50 to 0% by weight of a monomer copolymerizable therewith, 1 to 200 parts by weight of a copolymer having a multi-layer structure and 0.02 to 10 parts by weight of a fatty acid metallic salt.

The content of the copolymer having a multi-layer structure is preferably 30 to 160 parts by weight.

The content of the fatty acid metallic salt is preferably 0.1 to 5 parts by weight.

The fatty acid of the fatty acid metallic salt preferably has 8 to 20 carbon atoms.

The metal of the fatty acid metallic salt is preferably an alkali metal or an alkali earth metal.

The ionic valency of the metal of the fatty acid metallic salt is preferably 2.

The fatty acid metallic salt is preferably calcium stearate.

The copolymer having a multi-layer structure is preferably a copolymer having a three-layer structure, which is obtained by polymerizing a monomer or monomer mixture containing at least alkyl (meth)acrylate ester in the presence of a two-layer polymer, which is obtained by polymerizing a monomer mixture containing at least alkyl acrylate ester and a crosslinkable monomer in the presence of a polymer comprising a monomer mixture containing at least methyl methacrylate and a crosslinkable monomer.

The copolymer having a multi-layer structure is preferably a copolymer having a two-layer structure, which is obtained by polymerizing a monomer or monomer mixture containing at least alkyl (meth)acrylate ester in the presence of an acrylic crosslinked rubber.

The present invention also relates to capstock comprising the (meth)acrylic resin composition.

The present invention also relates to an extrusion-molded article using the capstock.

DETAILED DESCRIPTION

The (meth)acrylic resin composition of the present invention contains 100 parts by weight of a methyl methacrylate polymer comprising 50 to 100% by weight of methyl methacrylate and 50 to 0% by weight of a monomer copolymerizable therewith, 1 to 200 parts by weight of a copolymer having a multi-layer structure and 0.02 to 10 parts by weight of a fatty acid metallic salt.

Examples of the monomer copolymerizable with methyl methacrylate are vinyl arenes such as styrene, α-methylstyrene, monochlorostyrene and dichlorostyrene; vinyl carboxylic acids such as acrylic acid and methacrylic acid and esters thereof; vinyl cyans such as acrylonitrile and methacrylonitrile; halogenated vinyls such as vinyl chloride, vinyl bromide and chloroprene; vinyl acetate; alkenes such as ethylene, propylene, butylene, butadiene and isobutylene; halogenated alkenes; and multifunctional monomers such as allyl methacrylate, diallyl phthalate, triallyl cyanurate, monoethylene glycol dimethacrylate, tetraethylene glycol dimethacrylate, divinylbenzene and glycidyl methacrylate. In the case that the (meth)acrylic resin composition of the present invention is used as capstock resin for covering the surface of materials used outdoors by utilizing excellent weather resistance of polymethyl methacrylate, a (meth) acrylic ester monomer with an alkyl group having 1 to 12 carbon atoms, which does not impair weather resistance, is preferably used as the copolymerizable monomer. Examples of the (meth)acrylic ester with an alkyl having 1 to 12 carbon atoms are methyl acrylate, ethyl (meth)acrylate, propyl (meth)acrylate, butyl (meth)acrylate, hexyl (meth)acrylate, cyclohexyl (meth)acrylate, 2-ethylhexyl (meth)acrylate, octyl (meth)acrylate, isobornyl (meth)acrylate, phenyl (meth)acrylate and benzyl (meth)acrylate.

The methyl methacrylate polymer contains 50 to 100% by weight, preferably 50 to 99.9% by weight, more preferably 70 to 98% by weight of methyl methacrylate and 50 to 0% by weight, preferably 50 to 0.1% by weight, more preferably 30 to 2% by weight of a monomer copolymerizable with methyl methacrylate. When the content of methyl methacrylate is less than 50% by weight, appearance, weather resistance and heat resistance, which are characteristic of (meth) acrylic resin, tend to decrease.

In the present invention, the methyl methacrylate polymer is obtained by suspension polymerizing the mixture of methyl methacrylate and a monomer copolymerizable therewith. The average particle size of the polymer particles obtained by suspension polymerization is not particularly limited, but is preferably 50 to 500 μm as obtained in the usual suspension polymerization process. More preferably, the average particle size is 50 to 250 μm, from the viewpoint that in the case that polymer particles are compounded with ingredients added when processing such as a impact modifier and a processing aid, separation does not occur when transporting and extrusion molding and mixing and dispersion do not become inhomogeneous.

As the dispersion stabilizer for suspension polymerization, the usual inorganic and organic dispersion stabilizers can be used. Examples of the inorganic dispersion stabilizer are magnesium carbonate and tertiary calcium phosphate. As the organic dispersion stabilizer, natural substances and synthetic polymer dispersion stabilizers such as starch, gelatin, acrylamide, partially saponified polyvinyl alcohol, partially saponified polymethyl methacrylate, polyacrylic acid and salt thereof, cellulose, methyl cellulose, hydroxymethyl cellulose, hydroxyethyl cellulose, polyalkylene oxide, polyvinyl pyrrolidone, polyvinyl imidazole and sulfonated polystyrene; and low molecular weight dispersion stabilizers or emulsifiers such as alkyl benzene sulfonate and fatty acid salt can be used. Partially saponified polyvinyl alcohol, which is usually used in suspension polymerization of a methyl methacrylate polymer, is preferable. By using partially saponified polyvinyl alcohol, the average particle size of the suspension polymer particles can be kept to 50 to 250 μm, which is preferable when compounding with ingredients added when processing such as a impact modifier and a processing aid, and stable polymerization properties can be obtained.

As the polymerization initiator for suspension polymerization, peroxides such as benzoyl peroxide and lauroyl peroxide and azo compounds such as azo bis isobutyronitrile can be used. Also, to adjust molecular weight, a chain transfer agent can be used. As the chain transfer agent, alkyl mercaptan having 2 to 18 carbon atoms, thioglycollic acid ester and mercaptic acids such as β-mercapto propionic acid and aromatic mercaptan including benzyl mercaptan, thiophenol, thiocresol and thionaphthol can be used. Particularly, alkyl mercaptan having 4 to 12 carbon atoms is preferable.

For preparing the suspension polymer particles of the methyl methacrylate polymer, all known methods can be used, such as the method of suspending the monomer or monomer mixture in water and then conducting the polymerization reaction and the method of conducting the polymerization reaction by suspending part of the monomer or monomer mixture in water to start the polymerization reaction and then, as the polymerization reaction progresses, adding the remaining water suspension of the monomer or monomer mixture to the polymerization reaction bath either continuously or divided into one or more steps.

The method for adding the polymerization initiator and the chain transfer agent is not particularly limited, but the method of dissolving both the polymerization initiator and the chain transfer agent in the monomer, suspending the monomer in water and then conducting the polymerization reaction is most preferable. The time required for polymerization differs according to the type and amount of the polymerization initiator and the polymerization temperature but is usually 1 to 24 hours. Also, when conducting suspension polymerization, components usually added when mold processing rigid plastic, such as a plasticizer, lubricant, stabilizer and UV ray absorbent, can be added to the monomer.

Examples of the method for recovering the suspension polymer of the methyl methacrylate polymer are the known methods of recovering by washing and drying and recovering by adding a polymer prepared by emulsion polymerization and an electrolyte to the suspension polymer particles while stirring. The polymer particles recovered by either method can suitably be used.

The copolymer having a multi-layer structure is an impact modifier essential for providing excellent impact resistance, which is necessary when using the (meth)acrylic resin composition of the present invention as capstock resin. 1 to 200 parts by weight, preferably 30 to 160 parts by weight of the copolymer is compounded based on 100 parts by weight of the methyl methacrylate polymer. When the amount is too small, sufficient impact strength cannot be obtained and when the amount is too large, the pressure of melted resin and torque when processing become high and processing becomes difficult.

The copolymer having a multi-layer structure is not particularly limited as long as the copolymer is an impact modifier usually used in (meth)acrylic resin, but preferably has a two to four layer structure, more preferably a three to four layer structure. As the copolymer having a multi-layer structure, a copolymer obtained by polymerizing a monomer mixture containing (meth)acrylic ester and when necessary, a monomer copolymerizable with (meth)acrylic ester, such as an aromatic vinyl monomer, in the presence of acrylic rubber is preferable from the viewpoints that compatibility with (meth)acrylic resin is favorable and strength is significantly improved. Various kinds of such copolymers having a multi-layer structure are known and for example, the multi-structural body disclosed in JP-B-55-27576 can be used. Particularly, (1) a copolymer having a three-layer structure, which is obtained by polymerizing a monomer or monomer mixture containing (meth)acrylic ester and when necessary, a monomer copolymerizable therewith in the presence of a two-layer polymer, which is obtained by polymerizing a monomer mixture containing alkyl acrylate ester, a crosslinkable monomer and when necessary, a monomer copolymerizable with alkyl acrylate ester in the presence of a polymer comprising a monomer mixture containing methyl methacrylate, a crosslinkable monomer and when necessary, a monomer copolymerizable with methyl methacrylate and (2) a copolymer having a two-layer structure, which is obtained by polymerizing a monomer or monomer mixture containing (meth)acrylic ester and when necessary, a monomer copolymerizable therewith in the presence of an acrylic crosslinked rubber can suitably be used. Such copolymers having a multi-layer structure are preferable from the viewpoints that compatibility with acrylic resin is favorable and strength is significantly improved.

In the copolymer having a three-layer structure described in (1), examples of the monomer copolymerizable with methyl methacrylate, which forms the inner most layer, are alkyl methacrylate esters having 2 to 8 carbon atoms such as ethyl methacrylate, propyl methacrylate and n-butyl methacrylate; acrylic esters having 1 to 12 carbon atoms such as methyl acrylate, ethyl acrylate, propyl acrylate, n-butyl acrylate, n-octyl acrylate and n-ethylhexyl acrylate; (meth) acrylic esters having a cyclic compound in the ester group such as cyclohexyl (meth)acrylate, isobornyl (meth)acrylate, phenyl (meth)acrylate and benzyl (meth)acrylate; aromatic vinyls such as styrene, α-methylstyrene, o-methylstyrene, m-methylstyrene, p-methylstyrene and chlorostyrene; acrylonitrile; (meth)acrylic acid and hydroxyethyl methacrylate. As the crosslinkable monomer, allyl methacrylate, allyl acrylate, divinyl benzene, diallyl maleate, diallyl fumarate, diallyl itaconate, monoallyl maleate, monoallyl fumarate and butadiene can be used. The weight ratio of the methyl methacrylate, the copolymerizable monomer and the crosslinkable monomer in the monomer mixture which forms the innermost layer is preferably 1 to 99.99:0 to 98.99:0.01 to 5, more preferably 50 to 99.9:0 to 49.9:0.1 to 3. When the proportion is out of this range, impact resistance, surface hardness and heat resistance tend to decrease and weather resistance tends to become poor.

Examples of the alkyl acrylate ester, which forms the middle layer, are alkyl acrylate esters with an alkyl group having 1 to 12 carbon atoms such as ethyl acrylate, n-butyl acrylate, n-octyl acrylate and 2-ethylhexyl acrylate. Examples of the monomer copolymerizable with alkyl acrylate ester are alkyl methacrylate esters having 1 to 8 carbon atoms such as ethyl methacrylate, propyl methacrylate and n-butyl methacrylate; (meth)acrylic esters having a cyclic compound in the ester group such as cyclohexyl (meth) acrylate, isobornyl (meth)acrylate, phenyl (meth)acrylate and benzyl (meth)acrylate; aromatic vinyls such as styrene, α-methylstyrene, o-methylstyrene, m-methylstyrene, p-methylstyrene and chlorostyrene; acrylonitrile; (meth)acrylic acid and hydroxyethyl methacrylate. Examples of the crosslinkable monomer are the same monomers as those described above for the innermost layer. The weight ratio of the alkyl acrylate ester, the copolymerizable monomer and the crosslinkable monomer in the monomer mixture which forms the middle layer is preferably 50 to 99.99:0 to 49.99:0.01 to 5, more preferably 70 to 99.9:0 to 29.9:0.1 to 3. When the proportion is out of this range, impact resistance tends to decrease and weather resistance tends to become poor.

Examples of the (meth)acrylic ester which forms the outermost layer are methyl (meth)acrylate, ethyl (meth) acrylate, propyl (meth)acrylate, butyl (meth)arylate, hexyl (meth)acrylate, cyclohexyl (meth)acrylate, 2-ethylhexyl (meth)acrylate, octyl (meth)acrylate, isobornyl (meth)acrylate, phenyl (meth)acrylate and benzyl (meth)acrylate. Examples of the monomer copolymerizable with (meth) acrylic ester are aromatic vinyl monomers such as styrene, o-methylstyrene, m-methylstyrene, p-methylstyrene, α-methylstyrene and chlorostyrene; acrylonitrile; (meth)acrylic acid and hydroxyethyl methacrylate. The weight ratio of the (meth)acrylic ester and the copolymerizable monomer in the monomer mixture which forms the outermost layer is preferably 50 to 100:0 to 50, more preferably 70 to 95:5 to 25. When the proportion is out of this range, impact resistance tends to decrease, weather resistance tends to become poor and the surface of the molded article tends to become rough.

In the copolymer having a three-layer structure described in (1), the weight ratio of the monomer forming the innermost layer, the monomer forming the middle layer and the monomer forming the outermost layer is preferably 3 to 50:10 to 92:5 to 87, more preferably 10 to 40:20 to 75:10 to 70. When the proportion is out of this range, impact resistance tends to decrease, weather resistance tends to become poor and the surface of the molded article tends to become rough.

In the copolymer having a two-layer structure described in (2), the acrylic crosslinked rubber can be formed by using the same monomers as the alkyl acrylate ester and the crosslinkable monomer used when forming the middle layer of the copolymer having a three-layer structure (1). Also, when necessary, a monomer copolymerizable with alkyl acrylate ester can be used. The outer layer is formed by polymerizing in the same manner the same monomers as the (meth)acrylic ester and the monomer copolymerizable therewith used when forming the outermost layer of the copolymer having a three-layer structure (1).

In the copolymer having a two-layer structure described in (2), the weight ratio of the acrylic crosslinked rubber and the monomer forming the outer layer is preferably 50 to 95:50 to 5, more preferably 70 to 90:30 to 10. When the proportion is out of this range, impact resistance and dispersability tend to decrease.

The polymerization method for obtaining a copolymer having such a multi-layer structure is not particularly limited but in actual use, a known emulsion polymerization method is convenient.

As the fatty acid metallic salt used in the present invention, metallic salt of saturated fatty acid or unsaturated fatty acid can be used. Particularly, fatty acid metallic salt of fatty acid having 8 to 20 carbon atoms is suitable. Also, the metal of the fatty acid metallic salt is preferably an alkali metal or an alkali earth metal. Examples are calcium stearate, magnesium stearate, calcium laurate, sodium palmitate, potassium palmitate, sodium oleate, lithium stearate, strontium stearate, barium stearate, cadmium stearate, cadmium laurate, zinc stearate and zinc laurate. Of these, from the viewpoints of the effect of preventing thermal degradation, toxicity and plate out properties, calcium stearate is particularly preferable. Also, from the viewpoints of the effect of preventing thermal degradation and water resistance, the ionic valency of the metal of the fatty acid metallic salt is preferably 2.

Although the dispersion effect is high, the partially saponified polyvinyl alcohol, which is preferably used as a dispersion stabilizer in suspension polymerization when obtaining the methyl methacrylate polymer used in the present invention, is known to relatively easily cause thermal degradation when processing near the molding temperature and to cause decoloration the lower the saponification degree. Although decoloration is small in comparison to partially saponified polyvinyl alcohol, other dispersion stabilizers such as methyl cellulose also cause decoloration under severe processing conditions. By adding a fatty acid metallic salt, thermal degradation, which occurs when processing the (meth)acrylic resin composition of the present invention containing the methyl methacrylate polymer obtained by suspension polymerization, can be significantly inhibited.

In the (meth)acrylic resin composition of the present invention, 0.02 to 10 parts by weight, preferably 0.1 to 5 parts by weight, of a fatty acid metallic salt is added based on 100 parts by weight of the methyl methacrylate polymer. When the amount is less than 0.02 part by weight, the effect of inhibiting thermal degradation when processing is small and when the amount is more than 10 parts by weight, plate-out objects are produced and problems may occur, such as staining of the cooling die when molding.

In the present invention, the method for mixing the methyl methacrylate polymer, the copolymer having a multi-layer structure and the fatty acid metallic salt is not particularly limited. The methyl methacrylate polymer, the copolymer having a multi-layer structure and the fatty acid metallic salt can be mixed together as powder, can be mixed in latex of the copolymer having a multi-layer structure obtained by polymerization or can be added when recovering suspension polymer particles.

The (meth)acrylic resin composition of the present invention is suitably used in an extrusion molded article such as a capstock.

When necessary for the quality of the capstock, additives such as a deglossing agent prepared by the known method of micro suspension polymerization, an antioxidant, a photostabilizer, a lubricant and pigment may be added when necessary. In the case that a deglossing agent is added, a capstock having low gloss can be obtained. Both organic and inorganic deglossing agents can be used. Examples of the inorganic deglossing agent are calcium carbonate, barium sulfate, aluminum hydroxide, talc, mica, glass and silica and examples of the organic deglossing agent are a styrene crosslinked polymer and an acrylic crosslinked polymer. Particularly, from the viewpoint of impact resistance when molding, an organic deglossing agent is preferable and a deglossing agent having a core/shell structure, in which the core layer is a rubbery alkyl acrylate polymer having an average particle size of 2 to 20 μm and the shell layer is compatible with a matrix polymer, described in for example JP-A-10-87710, JP-A-10-120714 and JP-A-10-120715, is more preferable.

The (meth)acrylic resin composition of the present invention is hardly discolored, as thermal degradation when processing is inhibited. For example, with the (meth)acrylic resin composition of the present invention, a molded article having a b value, which represents the degree of yellowing measured using a color-difference meter, of 1 to 20, more preferably 1 to 10, can be obtained. The b value can be measured for example according to JIS K7105.

Hereinafter, the present invention is explained in detail based on Examples and Comparative Examples but are not limited thereto.

EXAMPLE 1

<Preparation of Suspension Polymer>

A reaction vessel equipped with a stirrer was charged with 220 parts of deionized water and 15 parts by weight of a 3% aqueous solution of polyvinyl alcohol (GH-20: available from The Nippon Synthetic Chemical Industry Co., Ltd.) and the inside of the reaction vessel was substituted with nitrogen. Then, a monomer mixture comprising 90 parts by weight of methyl methacrylate, in which 0.5 part by weight of lauroyl peroxide and 0.5 part by weight of benzoyl peroxide are dissolved, and 10 parts by weight of butyl acrylate was added thereto and the rotational speed of the stirrer was adjusted so that the dispersion particle size of the monomer became approximately 250 μm. Thereafter, polymerization was completed by raising the temperature in steps and heating at 60° C. for 2 hours, 70° C. for 2 hours, 80° C. for 2 hours and 90° C. for 1 hour, to prepare a suspension polymer having a polymer solid content concentration of 30% by weight. The obtained polymer was washed and dried by a known method to obtain suspension polymer particles in the form of beads.

<Preparation of Copolymer Having a Three-layer Structure>

(a) Polymerization of Innermost Layer

A glass reaction vessel was charged with a mixture of the following composition and the temperature was raised to 80° C. while stirring in a nitrogen current. Then, 25% of the mixture of the innermost layer components comprising 24 parts by weight of methyl methacrylate, 1 part by weight of butyl acrylate, 0.1 part by weight of allyl methacrylate and 0.1 part by weight of t-butyl hydroperoxide was added at once and polymerization was conducted for 45 minutes.

| Mixture: | (parts) |
|---|---|
| Deionized water | 220 |
| Boric acid | 0.3 |
| Sodium carbonate | 0.03 |
| N-lauroyl sodium sarcosinate | 0.09 |
| Formaldehyde sodium sulfoxylate | 0.09 |
| Ethylenediamine sodium tetraacetate | 0.006 |
| Ferrous sulfate heptahydrate | 0.002 |

Subsequently, the remaining 75% of the mixture was continuously added over 1 hour. After adding, the temperature was maintained for 2 hours to complete polymerization. During this time, 0.2 part by weight of N-lauroyl sodium sarcosinate was added. The average particle size of the polymer particles in the latex of the obtained crosslinked methacrylic polymer was 1600 Å (found using light scattering of wavelength of 546 nm) and the polymerization conversion ratio ((amount of polymers produced/amount of monomers charged)×100) was 98%.

(b) Polymerization of Rubbery Polymer

A latex of the crosslinked methacrylic polymer obtained in (a) was maintained at 80° C. in a nitrogen current. After 0.1 part by weight of potassium persulfate was added, a monomer mixture comprising 41 parts by weight of n-butyl acrylate, 9 parts by weight of styrene and 1 part by weight of allyl methacrylate was continuously added over 5 hours. During this time, 0.1 part by weight of potassium oleate was added divided into three times. After adding the monomer mixture, 0.05 part by weight of potassium persulfate was added and the temperature was maintained for 2 hours to complete polymerization. The average particle size of the obtained polymer was 2300 Å and the polymerization conversion ratio was 99%.

(c) Polymerization of Outermost Layer

A latex of the rubbery polymer obtained in (b) was maintained at 80° C. After 0.02 part by weight of potassium persulfate was added, a mixture comprising 24 parts by weight of methyl methacrylate, 1 part by weight of n-butyl acrylate and 0.1 part by weight of t-dodecyl mercaptan was continuously added over 1 hour. After adding the monomer mixture, the temperature was maintained for 1 hour to obtain a latex of a three-layer structure graft copolymer. The average particle size of the obtained three-layer structure graft copolymer 2530 Å and the polymerization conversion ratio was 99%. The latex of the obtained three-layer structure graft copolymer was salted-out and coagulated, thermally treated and dried by a known method to obtain a copolymer having a three-layer structure in the form of white powder (impact modifier).

<Composition of (Meth)Acrylic Resin Composition and Preparation of Molded Article>

0.5 part by weight of SC-100 (calcium stearate, available from Sakai Chemical Industry Co., Ltd.), which is a fatty acid metallic salt, was added to 100 parts by weight of a mixture comprising 82% by weight of the obtained suspension polymer and 18% by weight of the multi-layer graft copolymer. The mixture was formed into pellets by extruding and kneading using a twin-screw extruder equipped with a vent (JSWTEW44SS-30W-3V: 44 m/m, made by Japan Steel Works, Ltd.) at a preset temperature of C2 to 3=210° C., C4=215° C., C6 to 7=220° C., C8=220° C., C9=220° C., D=220° C. Thereafter, using a press molding machine, a molded article with a thickness of 1 mm was prepared from the obtained pellets at under conditions of 190° C. for 10 minutes at a pressure of 100 kg/cm$^2$. The degree of yellowing of the obtained molded article was evaluated using a color-difference meter (made by Nippon Denshoku Industries Co., Ltd., Σ80 Color Measuring System). The results are shown in Table 1.

EXAMPLE 2

<Preparation of Copolymer Having Two-layer Structure>

(a) Preparation of Rubbery Polymer

A glass reaction vessel was charged with the following mixture and heated to 50° C. while stirring in a nitrogen current. Then, a monomer mixture comprising 100 parts by weight of n-butyl acrylate, 1 part by weight of allyl methacrylate and 0.1 part by weight of cumene hydroperoxide was dropped over 4 hours. Along with adding the monomer mixture, 2 parts by weight of a 5% aqueous solution containing potassium stearate was continuously added over 4 hours. After adding, stirring was continued for 5 hours to complete polymerization. The polymerization conversion ratio was 97% and the average particle size of the obtained polymer was 700 Å.

| Mixture: | (parts) |
|---|---|
| Deionized water | 250 |
| Potassium stearate | 0.5 |
| Formaldehyde sodium sulfoxylate | 0.2 |
| Ethylenediamine sodium tetraacetate | 0.01 |
| Ferrous sulfate heptahydrate | 0.005 |

(b) Preparation of Outer Layer

A glass reaction vessel was charged with 75 parts by weight (as solid content) of a latex of the rubbery polymer obtained in (a), 0.05 part by weight of formaldehyde sodium sulfoxylate, 0.01 part by weight of ethylenediamine sodium tetraacetate and 0.005 part by weight ferrous sulfate. Then, the aqueous dispersion was heated and stirred at 50° C. in a nitrogen current. Thereafter, 20 parts by weight of methyl methacrylate and 5 parts by weight of butyl methacrylate, which are the monomer components for graft polymerization, and 0.05 part by weight of cumene hydroperoxide, which is the polymerization initiator, were continuously added over 1 hour. After adding, 0.01 part by weight of cumene hydroperoxide was added and stirring was continued for 2 more hours to complete polymerization. The polymerization conversion ratio was 99.8%. Then, the latex of the obtained graft copolymer having a two-layer structure was salted-out and coagulated, thermally treated and dried by a known method to obtain a copolymer having a two-layer structure in the form of white powder (impact modifier). The average particle size of the graft copolymer having a two-layer structure was 1900 Å.

<Composition of (Meth)Acrylic Resin Composition and Preparation of Molded Article>

The molded article for evaluation was obtained by molding in the same manner as in Example 1, except that the copolymer having a two-layer structure was used instead of the copolymer having a three-layer structure of Example 1. The results of measuring the degree of yellowing are shown in Table 1.

COMPARATIVE EXAMPLE 1

The molded article for evaluation was obtained in the same manner as in Example 1, except that the fatty acid metallic salt was not used. The results of measuring the degree of yellowing are shown in Table 1.

COMPARATIVE EXAMPLE 2

The molded article for evaluation was obtained in the same manner as in Example 1, except that the amount of the fatty acid metallic salt was 0.01 part by weight. The results of measuring the degree of yellowing are shown in Table 1.

TABLE 1

| Ex. No. | b value |
|---|---|
| Ex. 1 | 3.1 |
| Ex. 2 | 6.5 |
| Com. Ex. 1 | 26.5 |
| Com. Ex. 2 | 22.3 |

According to the present invention, by adding a fatty acid metallic salt, particularly a specific fatty acid metallic salt, discoloring due to thermal degradation when processing, which was a problem of the conventional (meth)acrylic resin composition obtained by suspension polymerization, can be inhibited.

What is claimed is:

1. A (meth)acrylic resin composition comprising
   100 parts by weight of a methyl methacrylate polymer obtained by suspension polymerizing 50 to 100% by weight of methyl methacrylate and 50 to 0% by weight of a monomer copolymerizable therewith,
   1 to 200 parts by weight of a copolymer having a multi-layer structure and
   0.02 to 10 parts by weight of a fatty acid metallic salt.

2. The (meth)acrylic resin composition of claim 1, wherein the content of said copolymer having a multi-layer structure is 30 to 160 parts by weight.

3. The (meth)acrylic resin composition of claim 1, wherein the content of said fatty acid metallic salt is 0.1 to 5 parts by weight.

4. The (meth)acrylic resin composition of claim 1, wherein fatty acid of said fatty acid metallic salt has 8 to 20 carbon atoms.

5. The (meth)acrylic resin composition of claim 1, wherein the metal of said fatty acid metallic salt is an alkali metal or an alkali earth metal.

6. The (meth)acrylic resin composition of claim 1, wherein the ionic valency of said metal of said fatty acid metallic salt is 2.

7. The (meth)acrylic resin composition of claim 1, wherein said fatty acid metallic salt is calcium stearate.

8. The (meth)acrylic resin composition of claim 1, wherein said copolymer having a multi-layer structure is a copolymer having a three-layer structure, which is obtained by polymerizing a monomer or monomer mixture containing at least alkyl (meth)acrylate ester in the presence of a two-layer polymer, which is obtained by polymerizing a monomer mixture containing at least alkyl acrylate ester and a crosslinkable monomer in the presence of a polymer comprising a monomer mixture containing at least methyl methacrylate and a crosslinkable monomer.

9. The (meth)acrylic resin composition of claim 1, wherein said copolymer having a multi-layer structure is a copolymer having a two-layer structure, which is obtained by polymerizing a monomer or monomer mixture containing at least alkyl (meth)acrylate ester in the presence of an acrylic crosslinked rubber.

10. A capstock comprising the (meth)acrylic resin composition as in any one of claims 1, 2, 3, 4, 5, 6, 7, and 9.

11. An extrusion-molded article using the capstock of claim 10.

12. A process for preparing a (meth)acrylic resin composition comprising
   100 parts by weight of a methyl methacrylate polymer obtained by polymerizing 50 to 100% by weight of methyl methacrylate and 50 to 0% by weight of a monomer copolymerizable therewith,
   1 to 200 parts by weight of a copolymer having a multilayer structure, and
   0.02 to 10 parts by weight of a fatty acid metallic salt, wherein said methyl methacrylate polymer is obtained by suspension polymerization.

13. The process of claim 12, wherein the content of said copolymer having multi-layer structure is 30 to 160 parts by weight.

14. The process of claim 12, wherein the content of said fatty acid metallic salt is 0.1 to 5 parts by weight.

15. The process of claim 12, wherein fatty acid of said fatty acid metallic salt has 8 to 20 carbon atoms.

16. The process of claim 12, wherein the metal of said fatty acid metallic salt is an alkali metal or an alkali earth metal.

17. The process of claim 12, wherein the ionic valency of said metal of said fatty acid metallic salt is 2.

18. The process of claim 12, wherein said fatty acid metallic salt is calcium stearate.

19. The process of claim 12, wherein said copolymer having a multi-layer structure is a copolymer having a three-layer structure, which is obtained by polymerizing a monomer or monomer mixture containing at least alkyl (meth)acrylate ester in the presence of a two-layer polymer, which is obtained by polymerizing a monomer mixture containing at least alkyl acrylate ester and a crosslinkable monomer in the presence of a polymer comprising a monomer mixture containing at least methyl methacrylate and a crosslinkable monomer.

20. The process of claim 12, wherein said copolymer having a multi-layer structure is a copolymer having a two-layer structure, which is obtained by polymerizing a monomer or monomer mixture containing at least alkyl (meth)acrylate ester in the presence of an acrylic crosslinked rubber.

* * * * *

UNITED STATES PATENT AND TRADEMARK OFFICE
CERTIFICATE OF CORRECTION

PATENT NO. : 7,199,171 B2
APPLICATION NO. : 10/750833
DATED : April 3, 2007
INVENTOR(S) : Sakamoto It is certified that error appears in the above-identified patent and that said Letters Patent is hereby corrected as shown below:

Claim 10, line 2 (column 11, line 29), "any one of claims 1, 2, 3, 4, 5, 6, 7, and 9" should read --any one of claims 1, 2, 3, 4, 5, 6, 7, 8 and 9--.

Signed and Sealed this

Fifteenth Day of April, 2008

JON W. DUDAS
*Director of the United States Patent and Trademark Office*